Nov. 7, 1967 — G. DURST — 3,350,771
MANUFACTURE OF SEAMED METALLIC TUBING
Filed July 1, 1964 — 4 Sheets-Sheet 1
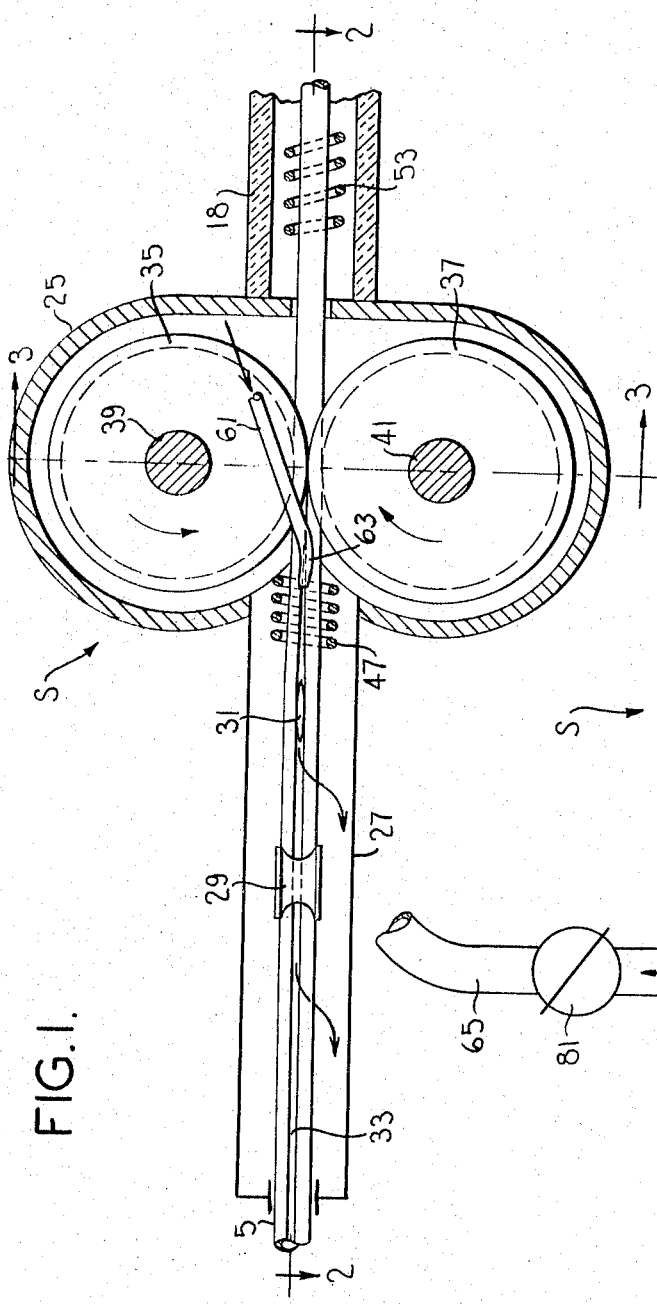
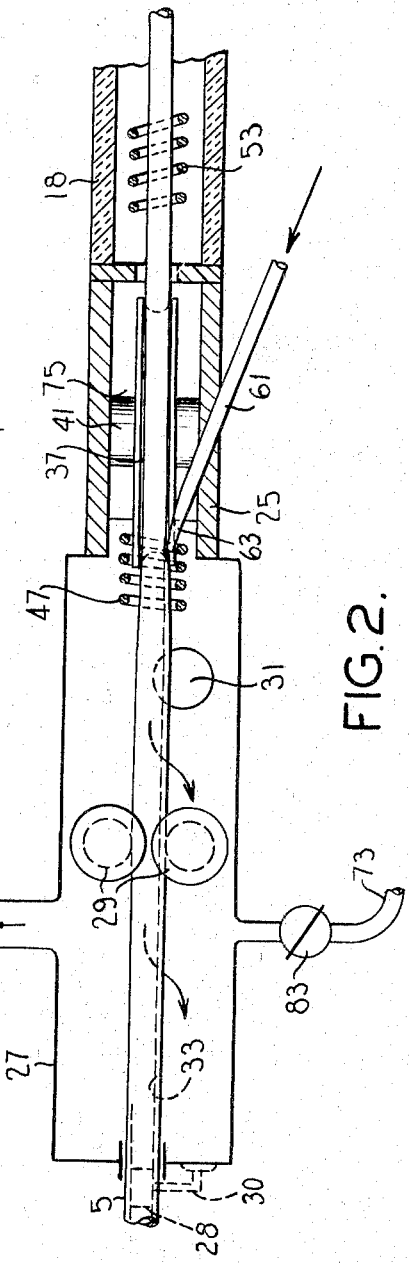
George Durst, Inventor
Koenig, Senniger, Powers and Leavitt, Attorneys Nov. 7, 1967      G. DURST      3,350,771

MANUFACTURE OF SEAMED METALLIC TUBING

Filed July 1, 1964      4 Sheets-Sheet 3

Nov. 7, 1967   G. DURST   3,350,771
MANUFACTURE OF SEAMED METALLIC TUBING
Filed July 1, 1964   4 Sheets-Sheet 4
FIG.7.
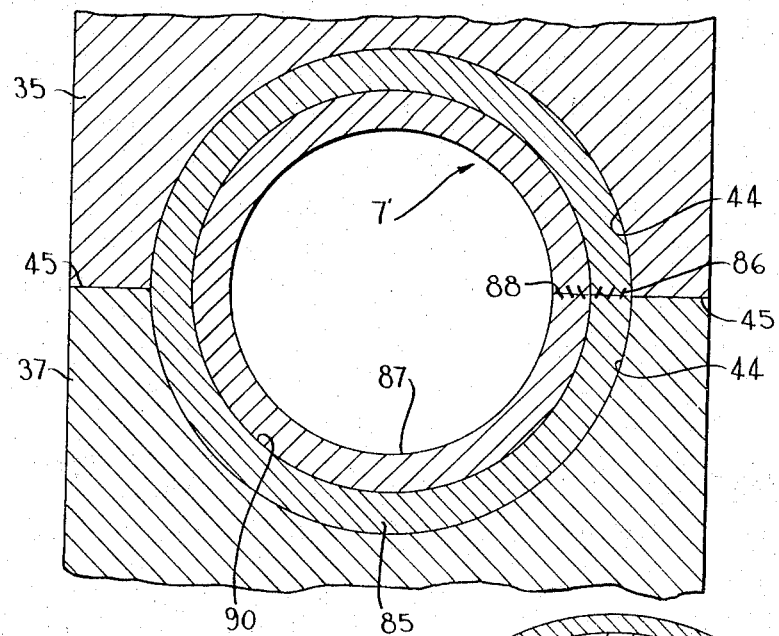
FIG.8.
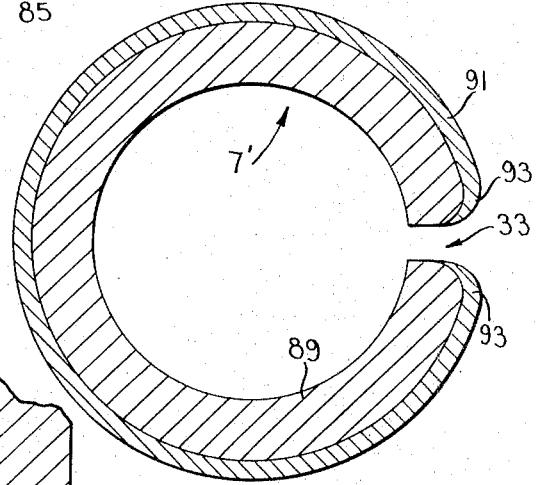
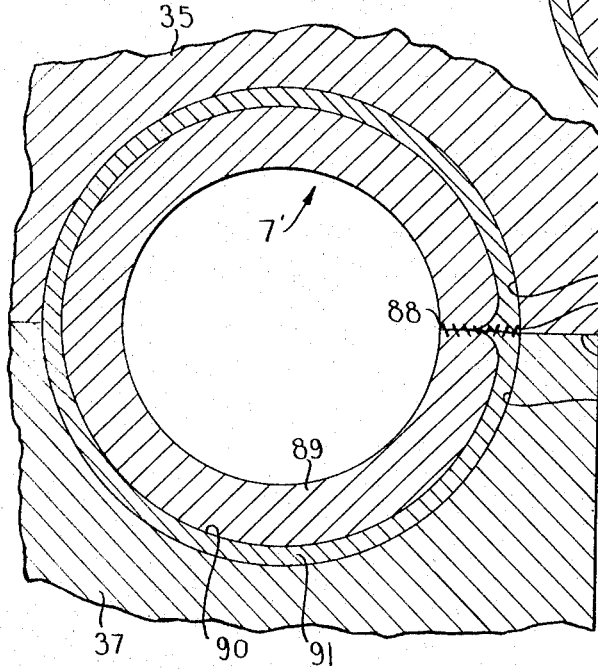
FIG.9.

United States Patent Office 3,350,771
Patented Nov. 7, 1967

3,350,771
MANUFACTURE OF SEAMED METALLIC TUBING
George Durst, Attleboro, Mass., assignor to Texas Instruments Incorporated, Dallas, Tex., a corporation of Delaware
Filed July 1, 1964, Ser. No. 379,614
4 Claims. (Cl. 29—477)

This invention relates to the manufacture of seamed metallic tubing, and with regard to certain more specific features, to the manufacture of such tubing wherein a single butt-type bonded seam is employed of the solid-phase type.

Among the several objects of the invention may be noted the provision of means for the manufacture of improved metallic tubing in either single-layer of multi-layer form having an accurately disposed seam which is solid-phase bonded, containing no cast structure and substantially no discontinuity of the tube material in the seam, said seam being perfectly formed so that the necessity for grinding and polishing operations is eliminated such as were formerly necessary to prepare seam welded tubes for certain applications; and the provision of means for manufacturing a seam of the class described which is stronger and more highly resistant to corrosion than heretofore. Other objects and features will be in part apparent and in part pointed out hereinafter.

The invention accordingly comprises the products, elements and combinations of elements, steps and sequence of steps, features of construction, composition and manipulation, and arrangements of parts which will be exemplified in the constructions, products and processes hereinafter described, and the scope of which will be indicated in the following claims.

In the accompanying drawings, in which one of various possible features of the invention is illustrated, FIG. 1 is a schematic vertical section illustrating certain roll-squeezing elements;

FIG. 2 is a schematic horizontal section taken on line 2—2 of FIG. 1;

FIG. 7 is a view similar to FIG. 6, further enlarged and illustrating application of the invention to the production of multi-layer tubing;

FIG. 8 is a cross section of an open-seam tube for carrying out a modification;

FIG. 9 is a view similar to FIG. 8 but illustrating the effect of a squeezing step applied to the tube illustrated in FIG. 8.

Corresponding reference characters indicate corresponding parts throughout the several views of the drawings.

Figure 3:
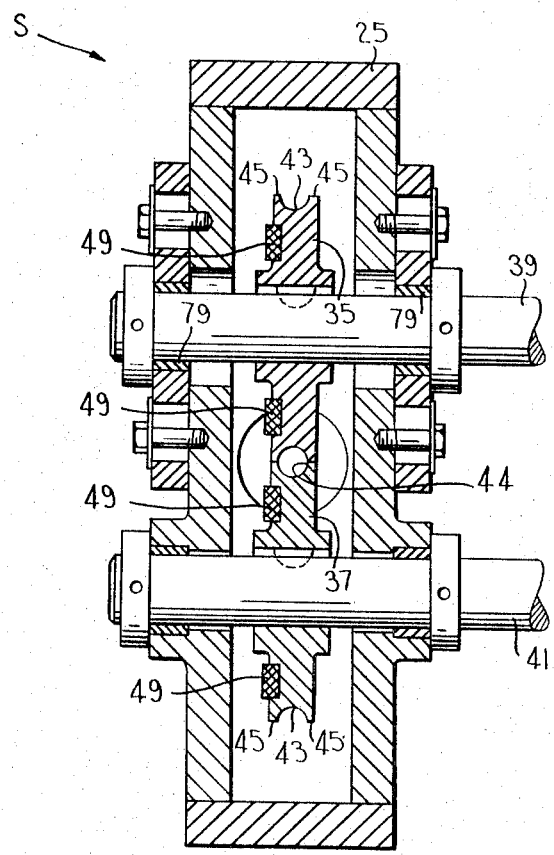
FIG. 3 is a schematic vertical section taken on line 3—3 of FIG. 1 without certain tubing.

The products obtained by the invention incorporate comparatively thin layers of material which it would be difficult to illustrate according to scale and it should therefore be understood that the drawings are illustrative rather than to a definite scale.

In the U.S. application Ser. No. 93,513 of Kenneth B. Clark, filed Mar. 6, 1961, eventuated as Patent No. 3,220,107, for Manufacture of Clad Rods, Tubing and Clad Tubing, several methods are illustrated for making tubing from strip material by solid-phase bonding. The present invention is an improvement thereon.

As is known, successful solid-phase bonding between two metallic surfaces requires, among other things, great cleanliness and a substantial interfacial squeezing pressure to obtain a green bond, and some heating for sintering if increase of bond strength is desired see U.S. Patents 2,691,815 and 2,753,623). The present invention provides in tube bonding apparatus conditions for obtaining the required pressure for bonding without excessive deformations such as would produce an undesirable seam.

The invention achieves the above conditions by providing for solid-phase bonding with smaller metal deformations under lower squeezing pressures than have been heretofore employed. I have found that reduction and pressure may be made lower in comparison with those formerly required if the mating surfaces have a higher degree of cleanliness than has been used in previously described solid-phase bonding processes and, preferably, if they are made relatively smooth, as by skiving or the like.

In particular I have found that a very high degree of cleanliness is obtainable while a specimen is heated only if steps are taken to remove contamination products more quickly than they are generated. These products, which are predominantly gases and vapors from the dissociation and evaporation of surface layers, form a cloud within a vacuum or protective atmosphere.

In a vacuum for a given temperature and a given chemical relationship between the metal surface and the contamination products, the concentration of matter within the cloud will mainly depend on the pumping speed for maintaining the vacuum and upon geometrical factors. Molecules which move in straight lines are reflected by surrounding parts. This action for instance, inside a tube being formed, occurs to such an extent that escape of the molecules through the pump is delayed. Thus, in a vacuum the concentration of contamination in a steady-state process is in an equilibrium condition. The condition remains constant as long as the controlling variables, including the speed of the specimen, remain constant.

On the other hand, in a protective atmosphere the concentration of contamination products (including water from the omnipresent oxygen, oxides, etc.) depends to a large extent upon the velocity and quantity of the gas intended to sweep out the contaminants. I have determined that by the use of a protective atmosphere dynamically applied that it is possible at low cost effectively to blow or sweep away gaseous contamination at a very high rate. On the other hand it is extremely difficult and costly by means of a vacuum to remove the contamination. Thus a properly directed jet or stream of very pure gas at a suitable velocity can be caused to eject the contaminating gases at a very much higher rate than the rate at which they are formed. If required, the cooling effect of the jet must be compensated for by an increase in heat input into the metal or by heating the gas in the jet. An important feature of the jet is that it shall have access to the tube interior through the open seam before closing and that it shall clean it out as rapidly as it cleans the more exposed portions. By comparison, in even the best of vacua contamination continues to bleed out through the seam at the point of closure which is a rather narrow escape route for gases moving by diffusion.

Thus my improvement is substantially a technique to change the chemical equilibrium conditions so as to arrive on what may be called super-cleanliness of the mating surfaces so that better seams may be obtained at lower squeezing pressures and reductions, thus minimizing distortions. This requires cleanliness much higher than has been practical in known continuous solid-phase cladding bonding processes and higher than had been thought feasible. There has been no need for such cleanliness in former related processes for several reasons: (1) the requirements for bond strength in strip cladding are in general satisfied at something less than maximum bond strength; (2) the problem of a disappearing bond line is less urgent; (3) roll cladding is more easily accomplished under high pressures that cannot be employed to achieve at the seam of a squeezed tube not supported from within; (4) the great pressure in the roll-cladding of strip makes the process more tolerant of surface contamination and imperfections than the lower pressure obtained in the tube bonding process; and (5) distortions can be accepted in roll cladding of strip which are not acceptable in the case of tube seaming.

By means of my new sweeping-out technique I can produce the stated super-cleanliness precisely where needed most. This makes it possible to create strong and well sinterable solid-phase bonds despite the low bonding pressure available at the tube seam. A strong bond in the seam, free from all but negligible imperfections, encourages a high degree of grain growth across the interface at the bond line which leads to disappearance of the interface in the final seam.

Figure 4:
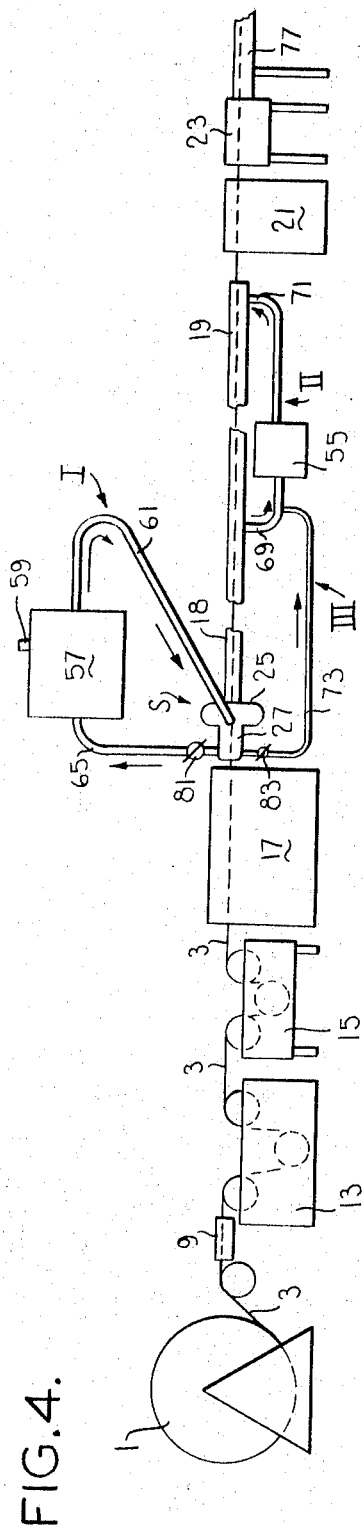
FIG. 4 is a diagram illustrating a line of certain devices performing a sequence of operations.
Figure 5:
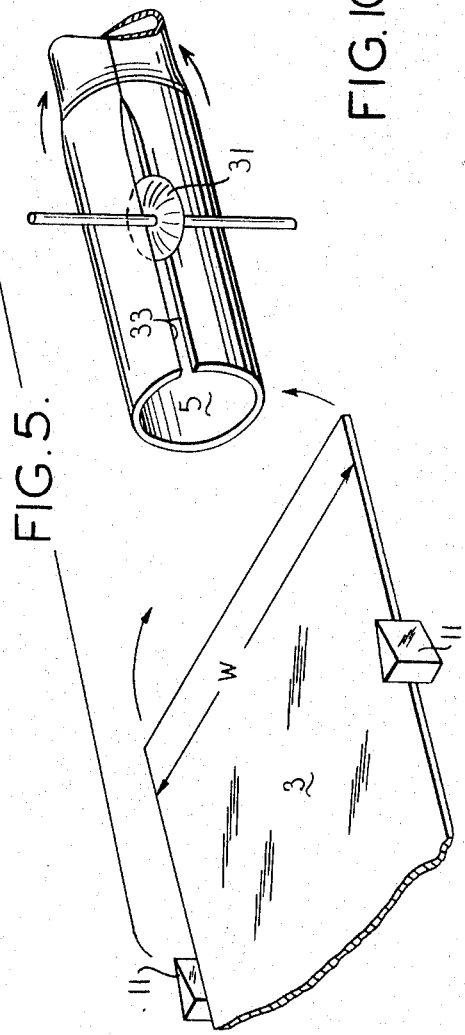
FIG. 5 is a trimetric view illustrating the progressive effects of certain operations.

FIGS. 1–3 schematically illustrate a solid-phase bonding station S. This station is in a line of apparatus shown diagrammatically in FIG. 4. Briefly, the FIG. 4 apparatus comprises a payoff reel 1 for a supply of transversely bendable metal strip material 3 which is to be preliminarily tubed with an open seam 33, as illustrated at numeral 5 in FIG. 5, and finally bonded as illustrated at numeral 7 (also in FIG. 5). Referring again to FIG. 4, the strip 3 passes through an edge-shaping device 9 comprising suitable edge skivers or other machining devices. These are diagrammatically illustrated at 11 (FIG. 5). In practice, skiving may consist in broaching, milling or in some instances be substituted by shearing. The strip 3, after having been edge-shaped, passes through suitable cleaning apparatus, including a degreaser 13 which may be of the vapor type, and then through a pickling, chemical cleaning, washing and drying apparatus 15. The particular cleaning means employed depends upon the metal composing strip 3. This cleaning step removes gross contaminants. Further details in this regard are not given, inasmuch as they are known to the art. The strip 3 then passes to a conventional tube mill 17 which curls the material from its strip form 3 to its open-seamed tube form 5 (FIG. 5). Final cleaning and maintenance thereof while bonding is now in order. This will be further detailed below.

At the station S the open-seamed tube 5 has the open seam solid-phase green bonded to produce the tube 7 (FIG. 5). The green bonded tube leaves the station S and passes first through a sintering section 18 for improving the bond and then through a cooling section 19. From this point the tube 7 passes through a sizing machine 21 to straighten it and to perfect its circularity. After leaving the sizing machine 21, the tube 7 is in finished form. It may then pass through a flying shear 23 to cut it to suitable lengths. The finished tubing may or may not be annealed.

Referring now to the apparatus at station S, illustrated in FIGS. 1–3, it comprises a plenum chamber 25 including an entry section 27 for receiving the open-seamed tubing 5 from the tube mill 17. In the illustrated example the seam is disposed sidewise. In this entry section 27 are tubing guide rolls 29 of which there may be several pairs if desired and a seam guide roll 31 which interdigitates with the slit designated 33. This is to secure proper alignment of the seam. If, as may be, skiving or milling is done within the chamber rather than before entering it, recontamination of the freshly skived surfaces will be substantially reduced by the atmospheric protection of the gas within the chamber. In the chamber 25 are power-driven squeeze rolls 35 and 37, their drive shafts being shown at 39 and 41, respectively. Their speed ratio is 1:1. One of these drive shafts 39 is supported in vertically adjustable bearings 79 so that the roll bite may be properly adjusted. A suitable universal joint (not shown) is associated with the drive shaft 39 to permit such adjustments.

The periphery of each roll contains a central semicircular groove 43, flanked by opposite cylindrical shoulders 45 which are near to or may be in rolling engagement. This makes the grooves 43 conjugate to form at the roll bite a substantially circular nip space 44 in the plane of the roll axes to receive the open-seamed tube 5 and squeeze it so as to close the seam under suitable pressure. Roll adjustment, width W of strip 3 and the circular cross section are so related that the sides of the open slit 33 are squeezed together with sufficient force to bring about solid-phase green bonding.

Figure 6:
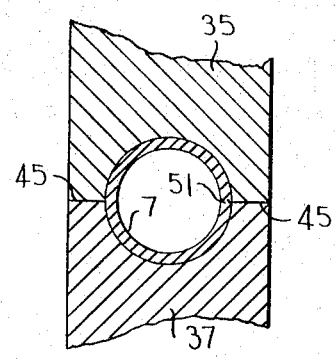
FIG. 6 is a fragmentary enlarged cross section showing certain relationships in a roll bite.

A feature to note from FIG. 6 is that the open slit 33 is brought together at an interface to form the solid-phase bonded seam 51 at one of the points of rolling or near rolling contact between one pair of shoulders 45, rather than at some other point in the circular form of the roll bite. I have discovered that by this means, more effective squeezing pressure can be brought to bear on the margins of the open slit 33 to be bonded than otherwise. Under such conditions less pressure loss due to friction of the strip in the roll bite is incurred. Therefore, at a given force between rolls a relatively high unit pressure is available where needed at the interface where slit 33 closes, and attendant distortions of the tubing are minimized.

For satisfactory results the interfaces of open slit 33 must be extremely clean and kept clean as they enter the roll bite. This is accomplished by rapid heating of the seam zone by an electric induction heating coil 47 surrounding the tube 5 as it enters the circular nip space at the roll bite. This drives off any films which may have reformed on the mating surfaces after they have been cleaned in apparatus 13 and 15 or after skiving in chamber 27. Other heating means may be used such as resistance heating. In order that the rolls may not exert a deleterious cooling effect, they are heated by annular electric heaters 49 carried by the rolls. The correct temperature of the rolls will depend on several variables in the process. Thus means must be provided to keep the roll temperature at the desired level not only at the start but during the duration of a run. It is thus possible that after the first moments of a bonding run the rolls may become too hot. Consequently, the rolls may require not only heating but also cooling devices, and means to switch from one to the other. These are not illustrated, their applications to the rolls being within the skill of the roll heating and cooling art.

As above made clear, it is important to carry out the squeezing step at station S under a suitable atmosphere, free of any major trace of contamination which might reach the clean surfaces to be bonded, including contamination from out-gassing products from the material of the tube. While a vacuum could be used for this purpose, it would require intricate high capacity evacuating means. Also it may not guarantee best possible bonds. Therefore it is preferred to employ a protective and scavenging protective gas at the roll bite, such as hydrogen, helium, argon or the like. A primary scavenging gas loop I (see FIG. 4) is provided for the station S, consisting of a gas pump and purifier 57 having a charging inlet 59 and a gas loop between it and the compartment 25, 27. Pipe 61 supplies pure gas from the purifier 57 at a constricted inlet nozzle 63 directly adjacent the roll bite where the slit 33 is closing. The inlet 63 (see FIGS. 1 and 2) is angled so as to obtain a sweeping current of gas directed at the open slit 33 where it is being closed, and also directed toward a return connection 65 with the purifier 57. A circulating flow occurs through passages afforded by the members 65, 57, 61, 25 and 27. The curved darts suggest flow down and out of the slit tube. These make up the gas loop I. A control valve 81 in loop I permits control of circulation for optimum conditions. Any contaminants exuding from the tube 5 is swept down the tube and out of its open slit faster than it can be formed as a contaminating cloud at the point of slit closure. This is in accord with the principles above set forth.

After the bonded tube 7 leaves the squeezing station S, it passes to the sintering section 18, where sintering is brought about by means of another electric induction heater 53 or its equivalent, adapted to bring about a rapid increase in temperature of the tube 7 as it leaves the rolls 35 and 37 at a relatively low temperature, so that sintering may be accomplished in a short interval of time. After sintering, the solid-phase seam is of such quality throughout that inclusions and open spaces are nil, which inhibits corrosion and favors a strong seam. In fact, the solid-phase bond in some instances can hardly be detected microscopically and visually not at all. This substantial disappearance of the bond line after squeezing and sintering is due to the rapid grain growth across the interface, which is not interferred with by microvoids or debris from any surface films at the bond interface.

At numeral 55 is shown a gas pump and heat exchanger connected by pipes 69 and 71 with opposite ends of the cooling section 19. These connections 69 and 71, taken with the pump and heat exchanger 55, make up a cooling gas loop II. In this loop II the gas flow has a lower velocity but higher volume than in loop I. The high-velocity protective gas jet at the constricted nozzle 63 in loop I serves not only to protect against atmospheric impurities but also to sweep out impurities forming from the tube at the point of bonding, while the ample flow in loop II serves for cooling. If additional cooling is desired, water-cooled walls and turbulence promoting features can be used around and in section 19.

At numeral 73 is a pipe connecting entry section 27 of chamber 25 with the cooling gas loop II. This may be referred to as a secondary scavenging loop III which supplies gas in part for cooling and in part for return through the sintering section 18 to the compartment 25. In pipe 73 is a control valve 83.

The third loop III serves as a by-pass through which small adjustable quantities of gas are circulated in order to keep the impurities in the sintering and cooling sections at a desired level. The sintered tube emerges from the cooling section 19 at a temperature low enough to prevent discoloration.

The above-described gas circulation system I, II, III meets the requirements of high purity of the protective atmosphere at the point of squeezing together of the mating surfaces of the open slit 33 and also the requirement for rapidly sweeping out the gaseous impurities coming from the open-seamed tube 5 as it moves toward the roll bite. Thus, although the impurities to be contended with have more than one source and may be vapors of contaminants, desorption products, and gases from the outgassing of the heated metal etc., they are all swept away from the roll bite and removed by the purifier 57. Also, since the sweep of protective gas in section 27 moves from the roll bite toward the incoming tubing, a back pressure exists in box 27, so that some protective atmosphere leaks out through the open seam 33, instead of any contaminating outside atmosphere entering at this point to contaminate the edges of the open seam to be bonded. This feature can be further enhanced by use of a floating plug located in the curled tube at the entrance to section 27, as indicated by dotted lines at 28 in FIG. 2, plug 28 being mounted on a fixed support 30 extending through the slit 33.

In view of the above, it will be seen that bonding, sintering and cooling occur rapidly under ideal conditions.

After leaving the cooling section 19, the bonded tube 7 enters the sizing machine 21, where it is finally straightened, rounded, and its diameter accurately sized, after which it passes through the flying shear 23 and moves out to a run-out table 77.

Following is a summary of preferred temperature ranges that may be employed at the squeezing step occurring at the roll bite for various materials composing the tube 7:

| Material: | Range, ° F. |
|---|---|
| Mild steel | 750–1500 |
| 304 stainless | 1300–1700 |
| Nickel | 1100–1500 |
| Copper | 950–1250 |
| Low brass | 1150–1300 |
| High brass | 1000–1200 |
| Cupronickel | 1200–1400 |
| Monel | 1200–1400 |
| Zr and zircaloy | 1350–1550 |
| 12K yellow gold | 1150–1250 |

While the improvements have been described in connection with a tube formed by a single layer of material, the same principles can be applied to the production of multi-layer tubing, such as illustrated in FIG. 7. In this case the basic strip may be composed of bimetal, for example, copper and steel; and when this is tubed and bonded as illustrated in FIG. 7, a tube such as 7' will result, wherein there is an outer layer 85 of steel bonded to itself at an outer seam 86, and an inner layer 87 such as copper also bonded to itself at a contiguous seam 88. It will be understood that the layers 85 and 87 will themselves have been preferably solid-phase bonded throughout their respective interfaces in the original strip form before arriving at the supply reel 1. Thus the final tube has a circular solid-phase bonded interface 90.

Figure 10:
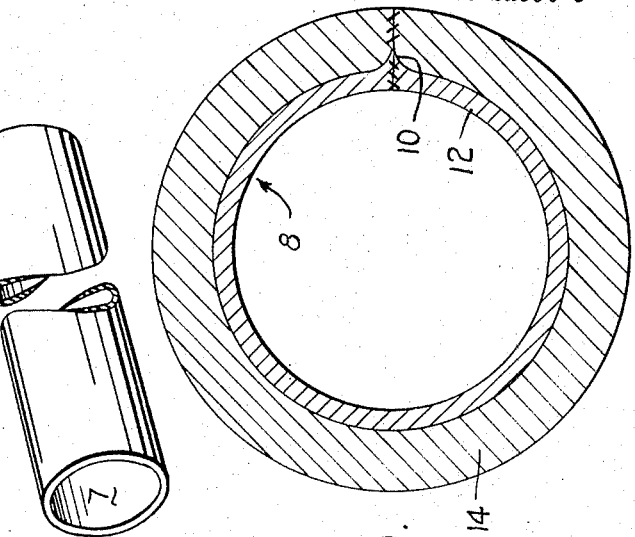
FIG. 10 is a view similar to FIG. 9 showing another form of product obtained by means of the invention.

For single- and multi-layer tubes of substantial thickness in each layer, it is preferred that the edges of the strip 3 be skived off more or less squarely with respect to the strip surface. There are, however, some kinds of bimetal tubing, for example "gold-filled" tubing having its corrosion-resisting noble metal layer on the outside. This is usually so thin that aligning it properly to bond to itself is out of the question. For this type of tube, skived edges are not employed; rather, I use what may be called the "tuck-in" method (FIGS. 8, 9 and 10). This method employs a gold-filled strip which has been edged in such a manner as to draw the thin gold layer over the edge. Known slicing or shearing cuts can be adjusted to accomplish this. Upon tubing there will then be a condition such as illustrated in FIG. 8. In this case the outer gold filling 91 extends or is intucked at the interface of the slit 33. FIG. 8 illustrates an inner wall 89 composed for example, of brass having the outer gold filling 91 tucked in by slice shearing as shown at 93. Then when the slit tube, as shown in FIG. 8, enters the roll bite as shown in FIG. 9, the tucked-in portions 93 of the gold filling 91 will themselves be solid-phase bonded and squeezed out substantially flat over a substantial area. The inner margins of the inner tube 89 also become solid-phase bonded. The result is a high quality exteriorly gold-filled tube having a solid-phase bonded seam portion. For wave guide and chemical tube applications where a thin inner lining of a precious or corrosion-resistant metal is desired, the process illustrated in FIGS. 8 and 9 can be reversed. The seamed tube 8 in this case is formed with the tucked-in portion 10 of the thin inner lining 12 at the inside of the thicker outside layer 14, with a resulting tube as shown in cross section in FIG. 10.

While the invention has been described in connection with the manufacture of circularly formed cylindrical tubing, it will be understood that other forms of such tubing may be made by appropriately shaping the nip space 44 at the roll bite, as for example with an elliptical cross section. Also tubes having longitudinal fins and profiles like T shapes, or in general having one or more "seams" may be made with properly designed rolls and jets etc.

Advantages of the invention are as follows:

The improved product can be made from substantially all kinds of single-layer and multi-layer materials. There is substantially no discontinuity between the seam and the tube material inasmuch as the solid-phase bonding involves no cast structure. Moreover, substantially no bulging nor any beads or fins occur outside or inside of the finished tubing such as would ordinarily be objectionable and require removal. There is also a substantial absence of a bond line in a conventional metallographic examination and in corrosion testing, indicating that there is an absence of any zone that is substatially structurally or chemically different from the parent metal. The process for making the product is rapid, reliable and economical.

It will be understood that if desired the enclosure 27 for providing a protective atmosphere may be extended to include the skiving, cleaning and curling apparatus 9, 13, 15 and 17.

In view of the above, it will be seen that the several objects of the invention are achieved and other advantageous results attained.

As various changes could be made in the above constructions, process and product without departing from the scope of the invention, it is intended that all matter contained in the above description or shown in the accompanying drawings shall be interpreted as illustrative and not in a limiting sense.

What is claimed is:

1. The process of manufacturing a seamed multi-layer tube having a thin layer on one side, comprising intucking the thin layer at the margins of a metallic strip, cleaning and tubing the strip to form an open slit between its intucked margins, moving the slit tube into the nip space formed by conjugate grooves in the margins of squeeze rolls, said rolls having opposed pairs of shoulders flanking their grooves, guiding the tube to place the open slit adjacent to an opposed pair of said shoulders, and squeezing the tube in the roll nip space to close the slit and form a solid-phase green bond between said intucked margins.

2. The process of manufacturing a seamed metal tube, comprising cleaning and curling a metal strip to form a tube having an open slit therein, moving the slit in one direction past a lateral seam-guiding member in the slit and laterally into the bite formed by conjugate grooves in the margins of squeeze rolls, said rolls having at least one pair of lateral shoulders flanking their grooves, the guiding member directing the open slit into the grooves adjacently to said shoulders, squeezing the tube within the bite to force together the edges of the slit to greenbond them in the grooves adjacent said pair of shoulders, directing a flow of scavenging protective gas into the slit at the point at which its edges contact one another immediately before laterally entering the bite, the general direction of said flow of gas at said point being opposite to the direction of the movement of the tube toward the bite, thereby to sweep away from the bite and the contacting edges of the slit any cloud of contaminating gases diffusing from the metal of the tube that might otherwise contaminate said edges as they engage.

3. The process according to claim 2, including the step of heating the tube near where the edges of the slit engage.

4. The process according to claim 3, including the step of sintering the green-bonded tube after it leaves the squeeze rolls to improve the bond.

References Cited

UNITED STATES PATENTS

| | | | |
|---|---|---|---|
| 1,522,963 | 1/1925 | Matthews | 29—477 |
| 2,017,360 | 10/1935 | Waterman | 29—477.7 |
| 2,222,579 | 11/1940 | Wolcott | 29—477 X |
| 2,265,129 | 12/1941 | Darner | 29—477.7 X |
| 2,715,263 | 8/1955 | MacGregor | 29—477.7 |
| 2,959,849 | 11/1960 | Rubin | 29—477.7 X |
| 3,220,107 | 11/1965 | Clark | 29—497.5 X |

JOHN F. CAMPBELL, *Primary Examiner.*

L. J. WESTFALL, *Assistant Examiner.*

UNITED STATES PATENT OFFICE
CERTIFICATE OF CORRECTION

Patent No. 3,350,771                      November 7, 1967

George Durst

It is hereby certified that error appears in the above numbered patent requiring correction and that the said Letters Patent should read as corrected below.

Column 2, line 5, for "see U. S." read -- ( see U. S. --; line 55, for "the jet" read -- the gas jet --; column 8, line 1, for "slit" read -- slit tube --.

Signed and sealed this 3rd day of December 1968.

(SEAL)
Attest:

Edward M. Fletcher, Jr.
Attesting Officer

EDWARD J. BRENNER
Commissioner of Patents